June 22, 1965 R. A. STAAT ETAL 3,190,306
SINGLE LEVER FAUCET
Filed July 25, 1963 2 Sheets-Sheet 2
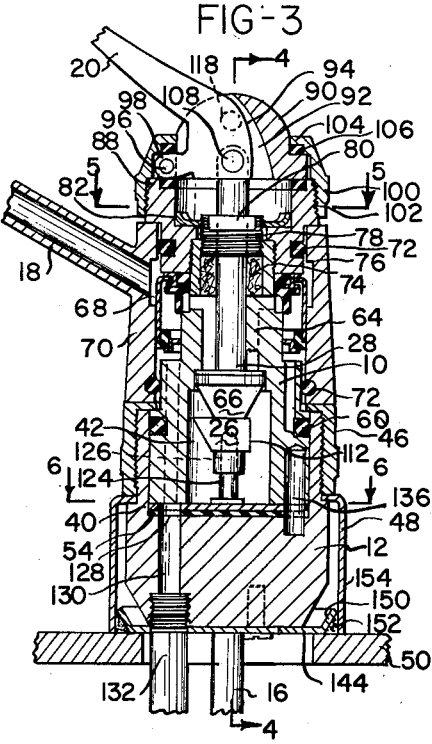
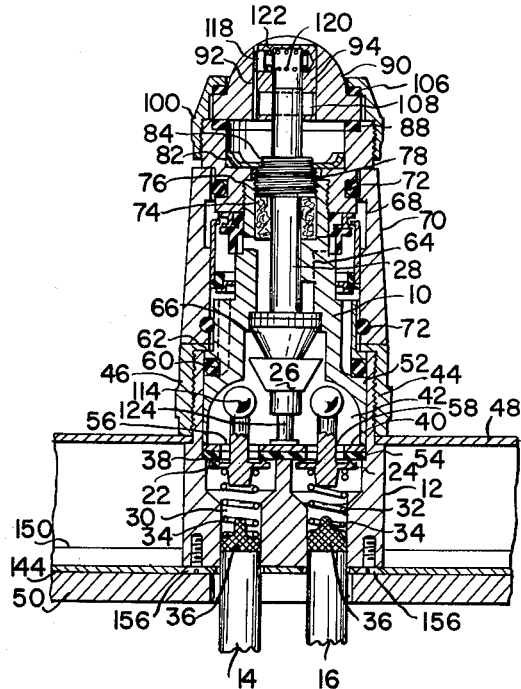
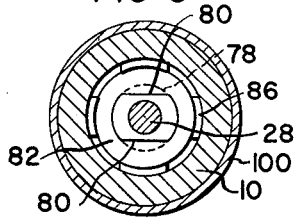
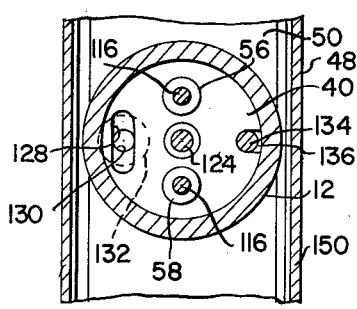
INVENTORS
ROBERT A. STAAT
AARON A. STAAT
BY *Kenney & Schenk*
ATTORNEY United States Patent Office 3,190,306
Patented June 22, 1965

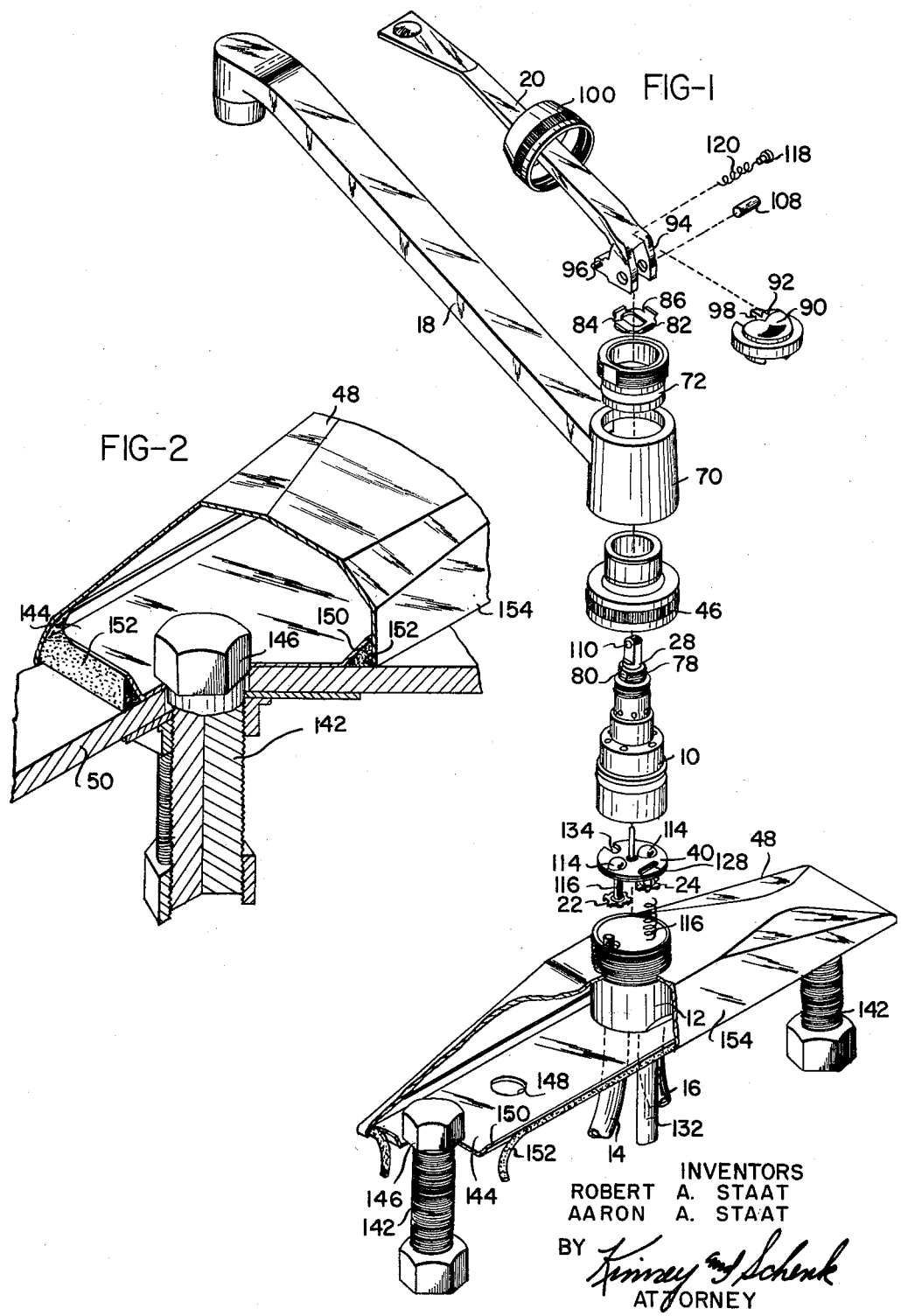

3,190,306
SINGLE LEVER FAUCET
Robert A. Staat, Ludlow, and Aaron A. Staat, South Fort Mitchell, Ky., assignors to Bal-Cam, Inc., Cincinnati, Ohio, a corporation of Ohio
Filed July 25, 1963, Ser. No. 297,723
13 Claims. (Cl. 137—328)

The present invention relates to a mixing faucet, such as may be used for delivering hot or cold water, or any desired mixture of the two, by the manipulation of a single operating lever.

The faucet comprises generally a valve housing adapted for mounting upon a sink top, which latter supports also a cover or escutcheon member having a sealed or caulked relationship with the sink top, and a bolted connection thereto. Independently of the bolted connection, the valve housing has connections with hot and cold water supply pipes which feed hot and cold water to two individual control valves within the housing. By means of a single operating lever having lateral swinging movements as well as elevating and lowering movements, the control valves may be operated either singly or in unison, to effect discharge through a single spout, of hot water, cold water, or any desired mixture of the two satisfying the water temperature requirements and the force of discharge desired by the user.

An object of the invention, is to provide a faucet of the character mentioned above, which is so simply constructed and assembled as to enable the average user to service, adjust, or make replacements of parts when necessary, without the assistance of skilled labor and expensive or special tools.

Another object of the invention is to provide means whereby initial installation of the faucet is facilitated and expedited, with substantial savings of time and labor costs resulting.

Another object is to provide improved means for straining the water supply, and for simply and expeditiously adjusting for wear of the packing about the valve actuating stem whenever necessary, no special tools or extensive disassembly of the faucet being required.

A further object is to provide means for easily and neatly fitting the faucet escutcheon member to a sink top with the use of string caulking compound, thereby to provide an effective seal which is pleasing in appearance.

The foregoing and other objects are attained by the means described herein and illustrated upon the accompanying drawings, in which:

FIG. 1 is an exploded view in perspective showing details of the improved faucet.

FIG. 2 is an enlarged fragmental perspective view, partly in cross-section, illustrating the mode of fitting and caulking the faucet escutcheon member upon a sink top.

FIG. 3 is a vertical cross-section taken through the assembled faucet structure.

FIG. 4 is a cross-sectional view taken on line 4—4 of FIG. 3.

FIG. 5 is a transverse section taken on line 5—5 of FIG. 3.

FIG. 6 is a transverse section taken on line 6—6 of FIG. 3.

FIG. 7 is a cross-section of the lower portion of FIG. 4, shown on an enlarged scale with the valves in open position.

In the drawings, 10 and 12 denote, respectively, upper and lower housings which contain the internal means for controlling flow of hot and cold water from supply pipes 14 and 16 into the housings and from the single delivery spout 18. The flow is regulated by means of a single operating handle 20, which may be manually elevated, lowered, or swung laterally relative to the upright axis of housings 10 and 12, in actuating the hot and cold water inlet valves 22 and 24, respectively. Depending upon the position of handle 20, the faucet may be caused to dispense hot or cold water, or water at any intermediate temperature, delivered from spout 18 at any desired rate. This is accomplished by tilting the valves 22 and 24, or either of them, through the agency of a bodily shiftable cam 26 (FIG. 7) fixed upon a valve stem 28 which may be reciprocated and also rotated by means of operating handle 20.

The lower housing 12 has inlet ports 30 and 32 which connect with the supply pipes 14 and 16, and these ports contain compression springs 34 that act upon valves 22 and 24 to urge the latter toward closed position. The lower ends of springs 34 bear against the dome-shaped screens or strainers 36, which may be displaced upwardly for cleaning upon removal of the screens, as will become apparent.

Housing 12 is provided with an interior annular shoulder 38 to support horizontally a seat plate 40 for valves 22 and 24, and above the seat plate is a single large mixing chamber 42 into which both valves may discharge. The exterior portion 44 of housing 12 surrounding the mixing chamber, is to be externally screw-threaded as shown, for application thereto of a complementarily threaded escutcheon ring 46 which secures housing 12 to a cover member or escutcheon 48 resting upon the sink top 50.

The upper housing 10 has a cylindrical base portion 52 which snugly fits into chamber 42 of the lower housing, to bear upon the margin of valve seat plate 40 and hold the latter in fixed leakproof position upon shoulder 38. Plate 40 by preference carries upon its lower face a gasket or coating 54 against which the valves 22 and 24 are cushioned to preclude leakage and noise. The plate and gasket are apertured at 56 and 58 to permit upward passage of fluid when the valves are opened. Leakage of fluid between the housings is precluded by a gasket or O-ring 60, and housing 10 may be secured to housing 12 by means of an annular inner flange 62 of the escutcheon ring overlying an annular shoulder on housing 10 as shown.

Housing 10 has an enlarged axial bore 64 communicable with chamber 42 through a poppet 66 on stem 28 which lowers, with the stem, to permit passage of fluid through bore 64 and into spout 18 by way of an annular passageway 68 in the rotary hub 70 of the spout. Hub 70 rotationally surrounds housing 10, and is sealed at 72 against leakage.

The character 74 indicates a ring of packing confined within a gland 76 threaded into the upper end of housing 10, and which packing surrounds valve stem 28 to preclude leakage along the stem. A packing nut 78, threaded into the gland, serves to compress packing 74 and is subject to occasional tightening against the packing to ensure a leakproof joint along the reciprocable and rotatable stem 28. As indicated upon FIG. 5, nut 78 has a head provided with flats 80 or equivalent means to be gripped for rotating the nut and thereby compressing the packing material 74.

The means for rotating the packing nut 78 includes a built-in nut wrench 82 which may be in the form of a disc centrally apertured at 84, the aperture being shaped in correspondency with the angular head 80 of the packing nut, so that any rotational movement of the nut wrench enforces rotation of packing nut 78. At or adjacent to the periphery of wrench element 82, means may be provided for engagement of a common tool such as a screw-driver, punch, nail or the like, to be utilized in rotating the wrench element. Such means may consist of peripheral slots or notches 86, or equivalent expedients which may take the form of ribs, apertures, lugs or the like. In the embodiment illustrated, by way of example, the wrench element is generally disc-shaped with its outer margin upturned and serrated to provide alternate notches and lugs to be engaged by an end of a screwdriver in effecting rotation of the wrench element and the packing nut keyed thereto.

Upon the top of housing 10 is a bearing ring 88 of wear-resistant material, adapted to support a dome-shaped cap 90 milled or otherwise formed to provide a transverse slot or channel 92 in which may move the fulcrum head 94 of operating lever 20. Lever 20 fulcrums upon a horizontal pin 96 carried by the lever fulcrum head, the ends of the pin being rockable within a horizontal cross-channel 98 formed in cap 90 transversely of slot 92. Head 94 is held down upon bearing ring 88 by a circular ferrule 100 screw-threaded at 102 upon the upper end of housing 10, and having an inwardly directed annular top flange 104 overlying a bearing ring 106 encircling the dome portion of cap 90.

A cross-pin 108 carried by the head of lever 20, pivotally couples the apertured upper end 110 of stem 28 to the lever, so that an upward manipulation of the lever about fulcrum 96 moves the stem downwardly to open one or both of the valves 22–24. The lever also may be swung horizontally, carrying with it the dome-shaped head 90, to effect rotation of cam 26 which exercises a certain control over valves 22–24 as will be explained.

Cam 26 is seen to be of inverted trunated cone shape, with a vertical flat 112 traversing a chord of the circular top thereof, FIG. 3. The cam may be rotated by lever 20 to cause the cam to tilt both of the valves 22 and 24 (FIG. 7), when the cam is lowered. Tilting is effected by reason of the cam striking and laterally displacing a cam follower 114 mounted atop the rigid central post 116 of a valve. The extent to which the cam lowers, determines the rate of flow through the valves, as is obvious.

Now if the lever 20 be swung laterally to rotate cam 26, the flat face 112 may be presented to one of the followers 114, with the result that said one follower will remain free of contact with the cam. With the follower thereby remaining inactivated, its associated valve will remain seated and no fluid will be passed by that valve. The other valve, however, will have been tilted and opened by the action of the cam, with the rate of flow determined by the extent to which lever 20 is manipulated to lower the cam. At certain rotated positions of cam 26, one valve may be opened farther than the other for regulating the mixing of hot and cold water fed through the valves and discharged from spout 18.

Although pressure of water in supply pipes 14 and 16 tends always to seat the valves 22 and 24, springs 34 may be inserted in the inlet ports to yieldingly seat the valves in the event of water pressure failure. The springs may serve also to position the strainers or screens 36 for easy removal and cleaning as will be explained.

To assure that operating lever 20 will remain at any preselected elevated position, a friction device may be provided therefor in the form of an expandable pin 118, FIG. 4, which by the force of a small compression spring 120, is constantly urged against the adjacent face of slot 92. The spring and pin 118 may be assembled within a transverse hole 122 of the lever head.

With reference to FIGS. 3 and 6, 124 indicates a vertical guide pin fixed to the center of valve seat plate 40 and adapted for sliding engagement within a central bore 126 in the lower end of valve stem 28. Said pin serves not only to guide stem 28 in its vertical and rotational movements, but provides also a handle whereby the seat plate may be lifted from valve housing member 12 for servicing or replacement, as will be explained.

Valve plate 40 has an opening 128 therein leading to a bore 130 of housing 12, which bore may be connected by a flexible hose tapped in at 132 for supplying water from mixing chamber 42 to a spray head in usual manner. This feature is old in the art and forms no part of the present invention. A notch 134 in plate 40 is adapted to register with a fixed locating pin 136 to assure proper replacement of the plate after servicing, or when installing a new valve plate assembly.

To service or install a new valve plate assembly 40, it is necessary only to unscrew the escutcheon ring 46 until the upper housing 10 is released for lifting bodily from lower housing 12. The entire upper portion of the faucet, including the spout, the operating lever, and the valve actuating stem 28, lift off of housing 12 as a unit, to expose the valve plate 40 and its central guide pin 124 which may be grasped for lifting the valve plate and its assembled valves 22 and 24 as a unit from the interior of housing 12. Upon removal of the valve plate unit, springs 116 and screens 36 are rendered accessible for easy removal and cleaning, or replacement if desired. The operation is very simply and expeditiously performed, no particular skill being required.

It may here be noted that both supply pipes 14 and 16 enter the lower housing 12 at the base of the latter, and project through a single central hole 140 of the sink top. This construction greatly simplifies and expedites initial installation, with resultant savings of time, labor, and expense. With this construction, common bolts 142 may be employed to secure the escutcheon seal plate 144 upon the upper surface of the sink top, the bolts passing through alternative pairs of openings 146, 148 of the seal plate, depending upon the location or spacing of the cooperating holes of the sink top usually preformed at the factory.

The escutcheon seal plate 144 is generally flat and elongate, and according to the present invention it is provided with a circumferential inclined lip 150 turned upwardly and outwardly at an angle to provide a continuous pocket for accommodating caulking material 152 applied therein preferably in string form. The initial string formation of the caulking material 152 is best illustrated upon FIG. 1.

The seal plate 144 is dimensioned to fit more or less snugly inside the lower perimeter of the escutcheon or cover 48 (see FIG. 3) to complete the caulking material pocket all around the upright walls 154 of the escutcheon. The formation of a neat and effective seal is thereby assured, and caulking operation is obviously simplified and expedited.

As best illustrated upon FIG. 4, the base of valve housing 12 rests upon seal plate 144 and may be secured thereto by means of screws 156 which pass through the seal plate and anchor into the material of the valve housing as shown. Seal plate 144 and the covering escutcheon 48 may desirably be formed of metal.

The ease with which the valves and screens may be rendered accessible for cleaning or replacement has been explained hereinbefore. With equal facility, an unskilled person may gain access to the built-in packing nut wrench 82, for tightening the valve stem packing 74 in the event of leakage about the stem.

To gain access to wrench 82, it is necessary only to unscrew the ring or bonnet 100 and, as in FIG. 1, move it along the operating lever 20 to a displaced position; or if preferred, the ring or bonnet may be disassociated completely by slipping it off the free end of the operating lever. The dome-shaped cap 90 likewise may be simply lifted off the top of housing 10, while the operating lever 20 and stem 28 remain in position.

The aforesaid displacement of parts 100 and 90 exposes the nut wrench so that a screw-driver, punch, nail or other rigid implement may be engaged from above with lugs or extensions 86 of the packing nut wrench. The implement shank may then be pressed laterally against the side of lever head 94, and by rotating the lever and the implement butted against it, the nut wrench is easily rotated to tighten the packing nut. Once the nut has been tightened the required amount, the dome-shaped cap 90 may be replaced atop its seal ring 88 with fulcrum pin 96 engaging channel 98, and then the bonnet ring 100 may be reapplied onto screw-threads 102 to complete the assembly. The entire operation is simple and easy for anyone to perform without the assistance of technical aid or skill.

As stated in the objects preceding the detailed description, the various improvements embodied in the apparatus, initial installation and subsequent servicing thereof are rendered simple and expeditious with substantial savings of time, labor and expense. No unusual skill is required for these operations, and a neat and workmanlike installation is assured and maintained. A further advantage is that any required servicing or replacement of parts which may be subject to wear, can be performed with the use of common tools or implements customarily at hand.

It is to be understood that various modifications and changes may be made in the structural details of the apparatus, within the scope of the appended claims, without departing from the spirit of the invention.

What is claimed is:

1. A single lever mixing faucet comprising in combination, a valve housing, a liquid delivery spout carried thereby for receiving liquid therefrom, a pair of valves within said housing adapted for controlling feed of liquid from a source of supply to the delivery spout, a stem movably supported in the housing, means connected with said stem and movable thereby relative to said valves for actuating the latter, an operating lever mounted upon the housing for rotational and pivotal movement relative thereto and operatively connected with the said stem for moving the latter, a gland including packing material surrounding the said stem, a packing nut carried by the housing and adjustable toward the gland for compressing the packing material about the said stem, and a built-in wrench within the housing for adjusting the packing nut, the housing being formed to enclose said wrench and the wrench being accessible for actuation while the operating lever is in position upon the valve housing.

2. A single lever mixing faucet comprising in combination, a valve housing, a liquid delivery spout carried thereby for receiving liquid therefrom, a pair of valves within said housing adapted for controlling feed of liquid from a source of supply to the delivery spout, a stem movably supported in the housing relative to said valves, means in the housing connected with said stem and movable thereby relative to said valves for actuating the latter, an operating lever mounted on the housing for rotational and pivotal movement relative thereto and operatively connected with the said stem for moving the latter, a gland including packing material surrounding said stem, a packing nut carried by the housing and adjustable toward the gland for compressing the packing material about the stem, a wrench unit, means carried by the housing enclosing said unit, means coupling said unit with the packing nut, said wrench unit being constructed to be engaged by an actuating implement, means facilitating introduction into the wrench enclosing means at a side of the operating lever, of an actuating implement whereby the implement engaging the wrench may be moved by the operating lever when the latter is rotated, to impart rotation to the wrench and to the packing nut.

3. The device as set forth in claim 2, wherein the packing nut is provided with an angular head, and the wrench unit consists of a disc centrally apertured, with the aperture of the disc shaped complementarily to the angular head of the packing nut and surrounding said head, the disc having marginal abutments thereon for engagement with the implement aforesaid.

4. A single lever mixing faucet comprising in combination, a valve housing, a delivery spout carried thereby, a pair of valves within the housing for controlling feed of liquid from a source of supply to the delivery spout, an elongate valve actuating stem supported within the housing for rotation and reciprocation, and including means to engage and actuate the valves incident to the rotational and reciprocative movements of the said stem, an operating lever mounted atop the valve housing for vertical and horizontal swinging movement, means connecting said lever to the stem whereby movements of the lever are imparted to the stem, a gland within the housing and surrounding the said stem, said gland including packing material in contact with the stem, a rotatable packing nut adjustable toward the gland for compressing the packing material about the stem, the valve housing including an open upper end portion, said packing nut having an angular head surrounding the stem and disposed in said upper end portion of the housing, a disc in said housing portion having an aperture to fit the angular head of the packing nut, whereby rotation of the disc is imparted to said nut, and means on the disc engageable by an implement inserted into the said upper end portion of the housing along the operating lever, for rotating the disc and the associated packing nut as the operating lever is rotated in contact with the inserted implement to advance the latter with rotation of said lever.

5. The device as set forth in claim 4, wherein the operating lever includes a head having an upright face to abut the said inserted implement whereby said advancement of the implement is effected for causing said rotation of the packing nut, incident to horizontal swinging of the operating lever.

6. The device as set forth in claim 4, wherein the combination includes means displaceable independently of the operating lever for normally closing the said open upper end portion of the housing and covering the disc and the packing nut.

7. The invention according to claim 6, wherein the said means giving access to the said means on the nut allows placement of the said implement at the side of said operating lever while the latter remains connected to the stem whereby force may be applied to the said implement by turning the lever.

8. A mixing faucet comprising in combination, a valve housing, a delivery spout thereon, a pair of valves in the housing for controlling feed of liquid from a source of supply to the delivery spout, an elongate stem supported within the housing for reciprocal and rotational movement, means carried by the stem to actuate the valves incident to a movement of the stem, an operating lever mounted atop the valve housing for horizontal swinging movement, and means connecting said lever to the stem for imparting to the stem a movement of the lever, a gland within the housing and surrounding the said stem, said gland including packing material in contact with the stem, a rotatable packing nut encircling the stem and adjustable longitudinally thereof relative to the gland for compressing the packing material about the stem, means forming a part of the top of the housing whereby access to the nut may be had, and means on the packing nut engageable by an implement by way of said access means, for rotating the packing nut.

9. The device as set forth in claim 8, wherein the operating lever includes a head having a lateral face to abut and enforce advancement of the implement for rotating the packing nut, incident to horizontal swinging of the operating lever.

10. A mixing faucet comprising in combination, an upright hollow valve housing, a delivery spout connected thereto, said housing including a base having a lower substantially flat face, said base being provided with substantially parallel upright bores constituting two fluid inlet ports for fluid opening through said flat face, a pair of valves within the housing adapted for controlling feed of fluid through the inlet ports from a source of supply, a valve seat plate spanning the inlet ports and having seats therein upon which the valves may seat when closed, the housing having a mixing chamber in communication with the delivery spout, and which mixing chamber is isolated from the inlet ports by said valve seat plate, a strainer removably supported in each of said inlet ports, yielding means disposed upon the strainers and abutting each of the valves for urging the valves to closed position upon the seats of the valve seat plate, an elongate valve actuating stem supported within the housing for longitudinal reciprocation including means for effecting opening of said valves against resistance of the yielding means, means carried by the housing and coupled to said stem for actuating the latter, an elongate hollow escutcheon having a top wall supported by the valve housing, and side and end walls depending from the top wall, an elongate escutcheon seal plate having side and end margins fitted within the confines of the side and end depending walls of the escutcheon, and said seal plate having centrally located apertures through which are accessible the inlet port bores of the valve housing.

11. A mixing faucet comprising in combination, an upright hollow valve housing, a delivery spout carried thereon, said housing including a base having a lower substantially flat face, said base being provided with substantially parallel upright bores constituting two inlet ports for fluid and opening through said face, a pair of valves within the housing for controlling feed of fluid through the inlet ports from a source of supply, a valve seat plate spanning the inlet ports and having seats therein upon which the valves may seat when closed, the housing having a mixing chamber in communication with the delivery spout, and which mixing chamber is isolated from the inlet ports by said valve seat plate, an elongate valve actuating stem supported for longitudinal reciprocation within the housing including means for effecting actuation of the valves, an elongate hollow escutcheon having a top wall supporting the valve housing, and side and end walls depending from the top wall, an elongate escutcheon seal plate having side and end margins fitted within the confines of the depending side and end walls of the escutcheon, said side and end margins being inclined upwardly and outwardly to form elongate channels for receiving caulking material between the seal plate and the escutcheon side and end walls.

12. The combination set forth in claim 11, wherein the escutcheon seal plate is provided with centrally located apertures through which are accessible the two fluid inlet ports of the valve housing.

13. A mixing faucet comprising in combination, an upright hollow valve housing, a delivery spout carried thereon, said housing including a base having a lower substantially flat face, said base being provided with a pair of spaced upright bores constituting inlet ports for fluid and opening through said face, a pair of valves within the housing for controlling feed of fluid through the inlet ports from a source of supply, a valve seat plate spanning the inlet ports and having seats therein upon which the valves may seat when closed, the housing having a mixing chamber in communication with the delivery spout, and which mixing chamber is isolated from the inlet ports by said valve seat plate, an elongate valve actuating stem supported for longitudinal reciprocation within the housing including means for effecting actuation of the valves, an elongate hollow escutcheon having a top wall supporting the valve housing, and side and end walls depending from the top wall, an elongate escutcheon seal plate having side and end margins fitted within the confines of the depending side and end walls of the escutcheon, said side and end margins being inclined upwardly and outwardly to form with the walls of the escutcheon a circumferential channel for receiving caulking material, the escutcheon seal plate being apertured intermediate its ends to afford access to the two fluid inlet ports of the valve housing, and means located marginally of the seal plate aperture for securing the seal plate to the lower substantially flat face of the valve housing.

References Cited by the Examiner

UNITED STATES PATENTS

| 2,053,210 | 9/36 | Southgate | 137—359 |
| 2,792,847 | 5/57 | Spencer | 137—636.2 |
| 2,866,478 | 12/58 | Hyde | 137—607 X |
| 2,893,425 | 7/59 | Rimsha et al. | 137—607 |
| 2,939,484 | 6/60 | Leuthesser | 137—635 |
| 3,012,251 | 12/61 | Fife | 137—359 X |

FOREIGN PATENTS 861,933 11/40 France.

M. CARY NELSON, *Primary Examiner.*
HENRY T. KLINKSIEK, *Examiner.*